(12) United States Patent
Lee et al.

(10) Patent No.: US 10,318,355 B2
(45) Date of Patent: Jun. 11, 2019

(54) DISTRIBUTED GRAPH PROCESSING SYSTEM FEATURING INTERACTIVE REMOTE CONTROL MECHANISM INCLUDING TASK CANCELLATION

(71) Applicant: ORACLE INTERNATIONAL CORPORATION, Redwood Shores, CA (US)

(72) Inventors: Jinsu Lee, San Mateo, CA (US); Sungpack Hong, Palo Alto, CA (US); Siegfried Depner, Sunnyvale, CA (US); Nicholas Roth, San Jose, CA (US); Thomas Manhardt, San Carlos, CA (US); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 52 days.

(21) Appl. No.: 15/413,811

(22) Filed: Jan. 24, 2017

(65) Prior Publication Data
US 2018/0210761 A1  Jul. 26, 2018

(51) Int. Cl.
*G06F 9/46* (2006.01)
*G06F 9/50* (2006.01)
*G06F 9/54* (2006.01)

(52) U.S. Cl.
CPC ............ *G06F 9/5066* (2013.01); *G06F 9/546* (2013.01)

(58) Field of Classification Search
CPC ................................................. G06F 9/46–543
(Continued)

(56) References Cited

U.S. PATENT DOCUMENTS 6,041,306 A * 3/2000 Du ........................ G06F 9/4843
  705/7.26
7,167,850 B2 * 1/2007 Stanfill ................. G06F 9/4494
  706/45
(Continued)

OTHER PUBLICATIONS

Robert Ryan McCune, Tim Weninger, and Greg Madey: "Thinking Like a Vertex: A Survey of Vertex-Centric Frameworks for Large-Scale Distributed Graph Processing"; ACM Computing Surveys, vol. 48, No. 2, Article 25, Publication date: Oct. 2015.*
(Continued)

*Primary Examiner* — Francisco J Aponte
(74) *Attorney, Agent, or Firm* — Hickman Palermo Becker Bingham LLP (57) ABSTRACT

Techniques herein provide job control and synchronization of distributed graph-processing jobs. In an embodiment, a computer system maintains an input queue of graph processing jobs. In response to de-queuing a graph processing job, a master thread partitions the graph processing job into distributed jobs. Each distributed job has a sequence of processing phases. The master thread sends each distributed job to a distributed processor. Each distributed job executes a first processing phase of its sequence of processing phases. To the master thread, the distributed job announces completion of its first processing phase. The master thread detects that all distributed jobs have announced finishing their first processing phase. The master thread broadcasts a notification to the distributed jobs that indicates that all distributed jobs have finished their first processing phase. Receiving that notification causes the distributed jobs to execute their second processing phase. Queues and barriers provide for faults and cancellation.

20 Claims, 8 Drawing Sheets

(58) Field of Classification Search
USPC .......................................................... 718/104
See application file for complete search history.

(56) References Cited

U.S. PATENT DOCUMENTS

| | | | |
|---|---|---|---|
| 7,322,033 B2 * | 1/2008 | Ito | G06F 9/4887 |
| | | | 718/100 |
| 7,757,214 B1 | 7/2010 | Palcazk | |
| 8,266,289 B2 | 9/2012 | Saha | |
| 8,312,464 B2 | 11/2012 | Arimilli | |
| 8,645,429 B1 * | 2/2014 | Bik | G06F 17/30958 |
| | | | 707/798 |
| 9,183,058 B2 | 11/2015 | Li | |
| 9,361,154 B2 * | 6/2016 | Booman | G06F 9/4881 |
| 9,385,845 B1 * | 7/2016 | Austern | G06F 17/30958 |
| 9,477,532 B1 * | 10/2016 | Hong | G06F 9/4881 |
| 9,577,911 B1 * | 2/2017 | Castleman | H04L 67/34 |
| 9,652,286 B2 * | 5/2017 | Fan | G06F 9/4881 |
| 9,838,242 B2 * | 12/2017 | Tully | H04L 29/08882 |
| 9,852,230 B2 * | 12/2017 | Fleury | G06F 9/546 |
| 10,089,761 B2 * | 10/2018 | Viswanathan | G06T 11/206 |
| 2005/0027785 A1 | 2/2005 | Bozak | |
| 2007/0294665 A1 | 12/2007 | Papakipos | |
| 2009/0112784 A1 | 4/2009 | Brun | |
| 2010/0144629 A1 | 6/2010 | Beardsley | |
| 2012/0188249 A1 | 7/2012 | Kretz | |
| 2012/0222030 A1 | 8/2012 | Goossen | |
| 2012/0304192 A1 * | 11/2012 | Grove | G06F 9/5083 |
| | | | 718/105 |
| 2012/0324472 A1 | 12/2012 | Rossbach | |
| 2013/0031550 A1 * | 1/2013 | Choudhury | G06F 9/45558 |
| | | | 718/1 |
| 2013/0042254 A1 | 2/2013 | Archer | |
| 2013/0046894 A1 | 2/2013 | Said | |
| 2013/0086328 A1 | 4/2013 | Frank | |
| 2014/0096138 A1 | 4/2014 | Dean | |
| 2014/0108489 A1 * | 4/2014 | Glines | G06F 9/5066 |
| | | | 709/201 |
| 2014/0115596 A1 | 4/2014 | Khan | |
| 2014/0130056 A1 * | 5/2014 | Goodman | G06F 9/5044 |
| | | | 718/104 |
| 2014/0181831 A1 | 6/2014 | Le Scouarnec | |
| 2014/0215477 A1 * | 7/2014 | Chen | G06F 9/5066 |
| | | | 718/102 |
| 2014/0317292 A1 | 10/2014 | Odom | |
| 2014/0317635 A1 | 10/2014 | Konno | |
| 2015/0007182 A1 * | 1/2015 | Rossbach | G06F 9/4843 |
| | | | 718/102 |
| 2015/0135185 A1 | 5/2015 | Sirota | |
| 2015/0149503 A1 * | 5/2015 | Wollrath | G06F 17/30194 |
| | | | 707/770 |
| 2015/0187042 A1 | 7/2015 | Gupta | |
| 2016/0063037 A1 | 3/2016 | Savkil | |
| 2016/0140152 A1 * | 5/2016 | Sevenich | G06F 17/30386 |
| | | | 707/755 |
| 2016/0217007 A1 | 7/2016 | Ueno | |
| 2016/0292303 A1 * | 10/2016 | Hong | G06F 17/30958 |
| 2016/0342445 A1 | 11/2016 | Lugt et al. | |
| 2017/0032064 A1 * | 2/2017 | Walsh | E21B 47/00 |
| 2017/0124452 A1 * | 5/2017 | Tucker | G06F 9/5038 |
| 2017/0168751 A1 * | 6/2017 | Stevens | G06F 3/0652 |
| 2017/0199758 A1 | 7/2017 | Gschwind | |
| 2017/0339209 A1 | 11/2017 | Schmid | |
| 2017/0351551 A1 | 12/2017 | Manhardt | |
| 2018/0039709 A1 * | 2/2018 | Chen | G06F 17/30958 |

OTHER PUBLICATIONS

Pingpeng Yuan, Changfeng Xie, Ling Liu, Fellow, IEEE, and Hai Jin, Senior Member, IEEE: PathGraph: A Path Centric Graph Processing System—IEEE Transactions on Parallel and Distributed Systems, vol. 27, No. 10, Oct. 2016.*

Xin, et al., "GraphX: Unifying Data-Parallel and Graph-Parallel Analytics", dated Feb. 11, 2014, ACM, 12 pages.

Low et al., "Distributed GraphLab: A Framework for Machine Learning and Data Mining in the Cloud", Proceedings of the VLDB Endowment, vol. 5, No. 8, 12 pages, dated Aug. 27, 2012.

Mallette, Stephen, "Mapping a URI to JSON", https://github.com/tinkerpop/rexster/wiki/Mapping-a-URI-to-JSON, dated May 2, 2013, 1 page.

Mallette, Stephen, "Basic Rest API", https://github.com/tinkerpop/rexster/wiki/Basic-REST-API, dated May 30, 2013, 4 pages.

Open MP Application Program, http://www.openmp.org/mpdocuments/OpenMP_4.0_RC2.pdf dated 2013, 418 pages.

Nelson et al., "Latency-Tolerant Software Distributed Shared Memory", Technical Report UW-CSE-14-05-03, dated 2014, 13 pages.

Malewicz et al., "Pregel: A System for Large-Scale Graph Processing", SIGMOD, ACM, dated Jun. 2010, 11 pages.

Low et al., "GraphLab: A New Framework for Parallel Machine Learning", dated Jun. 25, 2010, 10 pages.

Karypis, et al., "Multilevel Algorithms for Multi-Constraint Graph Partitioning", Technical Report #98-019, dated May 5, 1998, 25 pages.

http://docs.oracle.com/javase/7/docs/api/java/util/concurrent/ForkJoinPool.html, "Class ForkJoinPool", last viewed May 20, 2015, 11 pages.

Grappa, "Scaling Data-intensive Applications on Commodity Clusters", http://grappa.io/, last viewed on May 6, 2015, 4 pages.

Giraph "Introduction to Apache Giraph", http://giraph.apache.org/intro.html, last viewed on May 6, 2015, 2 pages.

Dato.com, "GraphLab Create User Guide", Introduction, 1 page, last viewed on May 6, 2015, 1 page.

Schmid, U.S. Appl. No. 15/159,263, filed May 19, 2016, Advisory Action dated Nov. 9, 2018.

Manhardt, U.S. Appl. No. 15/175,920, filed Jun. 7, 2016, Office Action, dated Nov. 15, 2017.

Manhardt, U.S. Appl. No. 15/175,920, filed Jun. 7, 2016, Interview Summary, dated Feb. 21, 2018.

Manhardt, U.S. Appl. No. 15/175,920, filed Jun. 7, 2016, Final Office Action, dated Jun. 18, 2018

Lugt, U.S. Appl. No. 15/682,338, filed Aug. 21, 2017, Notice of Allowance, dated Mar. 1, 2018.

Lugt, U.S. Appl. No. 14/718,430, filed May 21, 2015, Office Action, dated Jan. 11, 2017.

Lugt, U.S. Appl. No. 14/718,430, filed May 21, 2015, Notice of Allowance, dated Apr. 20, 2017.

\* cited by examiner

DISTRIBUTED GRAPH PROCESSING SYSTEM FEATURING INTERACTIVE REMOTE CONTROL MECHANISM INCLUDING TASK CANCELLATION

FIELD OF THE DISCLOSURE

This disclosure relates to distributed processing of graphs. Remote techniques for job control and synchronization for distributed jobs are presented.

BACKGROUND

Graph analysis is a recently popularized methodology in data analysis that considers fine-grained relationships between data entities. Traditional data processing systems (e.g. databases) do not handle graph analysis well, especially for large graphs. Distributed frameworks have emerged that are specialized for graph processing, including GraphX and GraphLab.

However, being designed for batch-processing in mind, these distributed frameworks have inefficiencies for interactive use cases where concurrent clients of a distributed system want to use the system in ad hoc and/or interactive ways and from remote machines.

Because the existing distributed systems are designed for batch processing, they only expose a rudimentary application program interface (API) to the users. Consequently, the user needs to either use a dedicated (inflexible) client program provided by the distributed framework, or develop a custom batch program that uses the low-level API for controlling the distributed system. As such, interactive remote control of these distributed systems is difficult.

These distributed systems also do not fully support cancellation of already running jobs. Thus, a client must either wait until a submitted job or query finishes, or else shut down the distributed system to cancel the job. This may be problematic, because a distributed graph processing system may handle huge graphs that take several hours or days to load into memory and prepare for subsequent analysis.

For distributed graph processing systems, canceling a running job is a complicated task because existing mechanisms for distributed cancellation are cumbersome, unreliable, destructive of state, or otherwise inadequate. Furthermore, existing distributed systems do not gracefully handle exceptions. Thus, existing distributed job control is suboptimal.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Example Computer System
   2.1 Input Queue
   2.2 Graph Processing Job
   2.3 Master Thread
   2.4 Distributed Job
   2.5 Distribution
   2.6 Distributed Processor
   2.7 Processing Phase
   2.8 Synchrony
      2.8.1 Arrival at Barrier
      2.8.2 Barrier Release
   2.9 Sequence of Phases
   2.10 Configuration
3.0 Synchronization Process
   3.1 Preparation
   3.2 Horizontal Scaling
      3.2.1 Parallel Execution
   3.3 Synchronization
   3.4 Result Integration
4.0 Decoupled Tiers
   4.1 Remote Client
   4.2 Remote Future
   4.3 (De-) Queueing
   4.4 Polling
   4.5 Pipelining
   4.6 Results
   4.7 Response
5.0 Lifecycle
   5.1 Abrupt Termination
   5.2 Fault
   5.3 Retained State
   5.4 Cancel
6.0 Extensibility
   6.1 Message Type
   6.2 Handler
   6.3 Chain
   6.4 Operation
   6.5 Deployment
   6.6 Invocation
   6.7 Collaboration
   6.8 Translation
   6.9 Edge Server 7.0 Related Jobs
8.0 Serial Logic
9.0 Hardware Overview

1.0 General Overview

Techniques are provided for job control and synchronization of distributed jobs for graph processing. In an embodiment, a computer system maintains an input queue for buffering graph processing jobs. In response to de-queuing a graph processing job, a master thread partitions the graph processing job into distributed jobs. Each distributed job has a sequence of processing phases. The master thread sends each distributed job to a respective distributed processor.

Each distributed job executes a first processing phase of its sequence of processing phases. To the master thread, the distributed job announces completion of its first processing phase. The master thread has a phase barrier at which the distributed job waits.

Eventually, the master thread detects that all of the distributed jobs have announced finishing their first processing phase and are waiting at the phase barrier. The master thread broadcasts a notification to the distributed jobs that indicates that all of the distributed jobs have finished their first processing phase and that the phase barrier is released. Receiving that notification causes the distributed jobs to execute their second processing phase.

In embodiments, the master maintains an input queue and an output queue that, together with the phase barrier, provide increased opportunities to abruptly terminate the graph processing job, such as due to a fault or interactive cancellation. In embodiments, the master thread achieves extensibility with handlers that form a chain of responsibility to process diverse messages from the input queue and append responses onto the output queue.

2.0 Example Computer System

Figure 1:
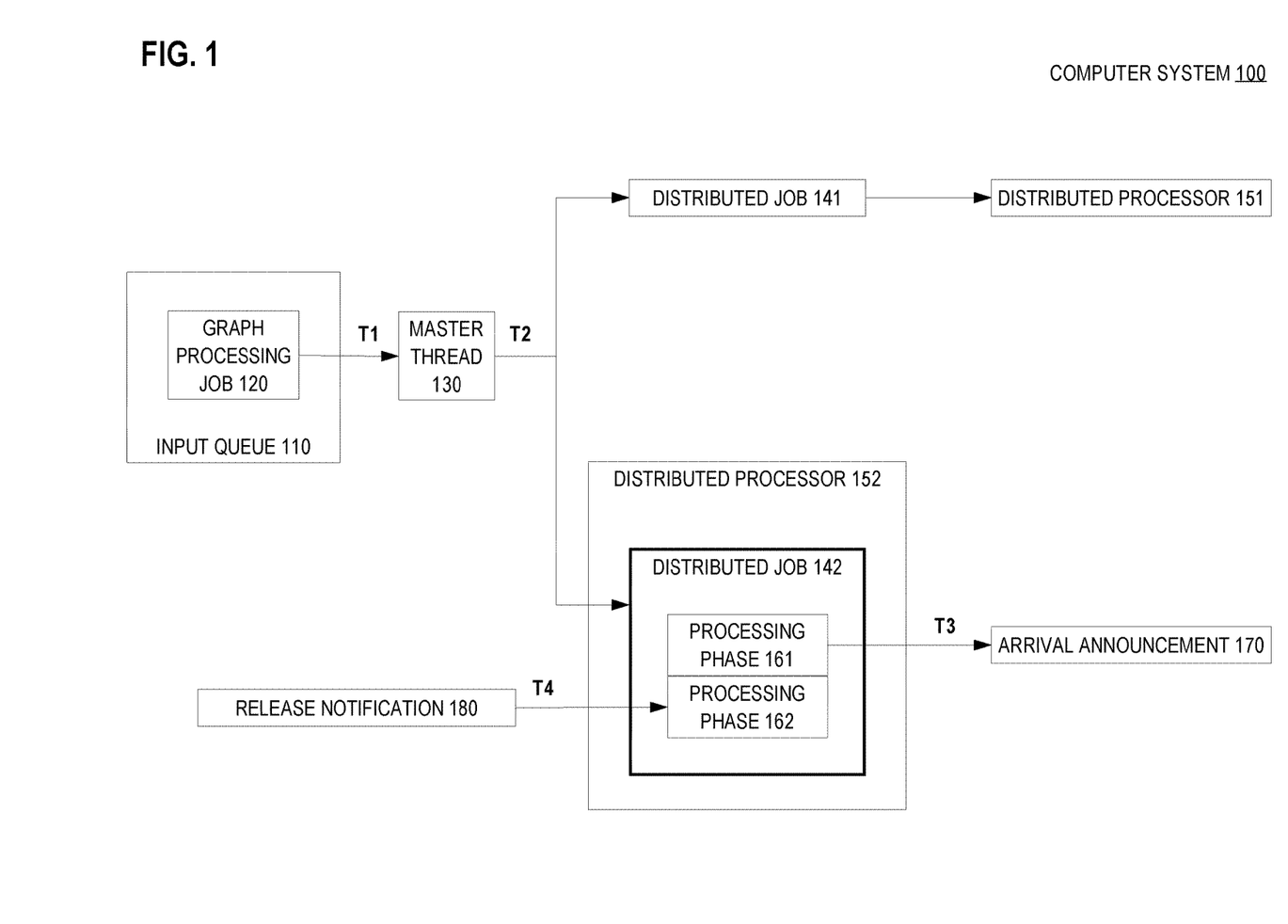
FIG. 1 is a block diagram that depicts an example computer system that synchronizes the processing phases of distributed graph-processing jobs, in an embodiment.

FIG. 1 is a block diagram that depicts an example computer system 100, in an embodiment. Computer system 100 synchronizes the processing phases of distributed graph-processing jobs.

Computer system 100 may be composed of one or more computers, including rack servers such as blades, personal computers, mainframes, network appliances, virtual machines, smartphones, or other computing devices. Computer system 100 may access data that is stored in memory, on disks, or over a network.

2.1 Input Queue

Computer system 100 includes master thread 130 and input queue 110 that buffers graph processing jobs, such as 120. Input queue 110 may comprise an array, a vector, a linked list, a stack, a heap, a file, or other data store.

Input queue 110 may receive and store graph processing job 120 from a local or remote client. For example, a remote client may use representational state transfer (REST), JavaScript object notation (JSON), simple object access protocol (SOAP), remote procedure call (RPC), extensible markup language (XML), and/or hypertext transfer protocol (HTTP) to deliver graph processing job 120 to input queue 110. Alternatively, computer system 100 may generate graph processing job 120.

2.2 Graph Processing Job

Graph processing job 120 specifies a command or logic to apply to a logical graph. Graph processing job 120 may comprise a script or codebase that analyzes the graph. For example, graph processing job 120 may comprise a graph query to extract data from the graph.

2.3 Master Thread

Master thread 130 may be a computational thread, an executable process, or another execution context for software. At time T1, master thread 130 de-queues (removes) graph processing job 120 from input queue 110.

2.4 Distributed Job

Graph processing job 120 comprises an algorithm that is entirely or partially parallelizable. Master thread 130 decomposes graph processing job 120 into one or more distributed jobs, such as 141-142.

Each of distributed jobs 141-142 may comprise or identify a script or codebase that analyzes the graph. In Java embodiments, distributed job 141 may comprise a serialized java.lang.Runnable instance.

In Java embodiments, distributed job 141 may comprise a class path and a class name of a Runnable subclass. Computer system 100 may execute distributed jobs 141-142 to fulfill graph processing job 120.

2.5 Distribution

At time T2, master thread 130 sends each of distributed jobs 141-142 to a respective distributed processor, such as 151-152. For example, master thread 130 may use REST, JSON, SOAP, RPC, XML, and/or HTTP to deliver distributed jobs 141-142 to distributed processors 151-152.

In a preferred embodiment, master thread 130 may use transport control protocol (TCP), network sockets, and/or a proprietary transfer format to deliver distributed jobs 141-142. If master thread 130 and distributed jobs 141-142 share memory, such as with symmetric multiprocessing (SMP), then buffer(s) or pointers may suffice for transferring distributed jobs 141-142.

2.6 Distributed Processor

Each of distributed processors 151-152 may comprise a processor core, a computer, a virtual machine, or another processing unit. In a preferred embodiment for horizontal scalability, each of distributed jobs 141-142 has its own distributed processor.

For example as shown, distributed job 141 is sent to distributed processor 151. Whereas, distributed job 142 is sent to distributed processor 152.

Each of distributed processors 151-152 may be long lived. For example, distributed processors 151-152 may each be deployed as a running program, an installed service, or a software container such as for inversion of control.

For example, distributed processors 151-152 may comprise a servlet container or other web container. However in a preferred embodiment, distributed processors 151-152 do not comprise a web container and use TCP instead of HTTP.

Furthermore, distributed processor 151 may preserve its state before and after executing distributed job 141. For example, input queue 110 may contain many graph processing jobs that, when applied in sequence to a same graph, may consume data from a prior graph processing job and produce data for a subsequent graph processing job.

2.7 Processing Phase

Each of distributed processors 151-152 may execute its own distributed job as a sequence of processing phases. Distributed jobs 141-142 may be symmetric, such that both distributed jobs have similar phases.

For example as shown, distributed job 142 has a sequence of processing phases that include 161-162. Although not shown, distributed job 141 may have the same phases as distributed job 142.

2.8 Synchrony

Furthermore, distributed jobs 141-142 should execute their same processing phase at a same time. For example, when distributed jobs are received, both of distributed jobs 141-142 may execute a first processing phase, such as 161.

Furthermore, distributed jobs 141-142 should execute a next processing phase at a same time. For example, if distributed job 142 finishes processing phase 161 before distributed job 141 finishes the same phase, then distributed job 142 should wait and not begin the next processing phase, 162, until distributed job 141 finishes processing phase 161.

2.8.1 Arrival at Barrier

As such and although not shown, computer system 100 operates a phase barrier that all of distributed jobs 141-142 should arrive at after finishing a current processing phase and wait until all of distributed jobs 141-142 have arrived at the phase barrier. In a preferred embodiment, master thread 130 operates the phase barrier.

At T3, distributed processor 152 finishes distributed job 142 and sends barrier arrival announcement 170. For example, distributed job 142 may send arrival announcement 170 in a network message to master thread 130. In embodiments, arrival announcement 170 identifies distributed processor 152, distributed job 142, processing phase 161, and/or graph processing job 120.

2.8.2 Barrier Release

Master thread 130 should not release the phase barrier until all of distributed jobs 141-142 have finished the current processing phase and sent an arrival announcement. At time T4, all arrival announcements have been received, and computer system 100 releases the phase barrier by sending release notification 180 to all distributed jobs. For example, master thread 130 may broadcast release notification 180 to distributed jobs 141-142.

When distributed jobs 141-142 receive release notification 180, they begin the next processing phase, 162. In this way, distributed jobs 141-142 are synchronized, and computer system 100 may monitor and report the progress of graph processing job 120.

2.9 Sequence of Phases

In this example as shown, distributed job 142 has only two processing phases. However, other examples may involve more processing phases.

For example and although not shown, processing phase 162 may finish and send an arrival announcement. Likewise and not shown, master thread 130 may eventually broadcast a release notification so that distributed jobs 141-142 may begin a third processing phase.

2.10 Configuration

Likewise and although not shown, input queue 110 may contain other graph processing jobs besides 120. Depending on the embodiment, master thread 130 may either wait or not wait for graph processing job 120 to finish before de-queueing, partitioning, and distributing another graph processing job.

Likewise and although not shown, input queue 110 may be shared by many master threads, such as 130. For example, a graph processing job 120 may be de-queued, partitioned, and distributed by whichever master thread is currently available (idle). In embodiments with Java's concurrency package, master threads may be executors that occupy a shared thread pool.

Likewise, each master thread may have its own input queue. For example, each client may have its own input queue and master thread.

3.0 Synchronization Process

Figure 2:
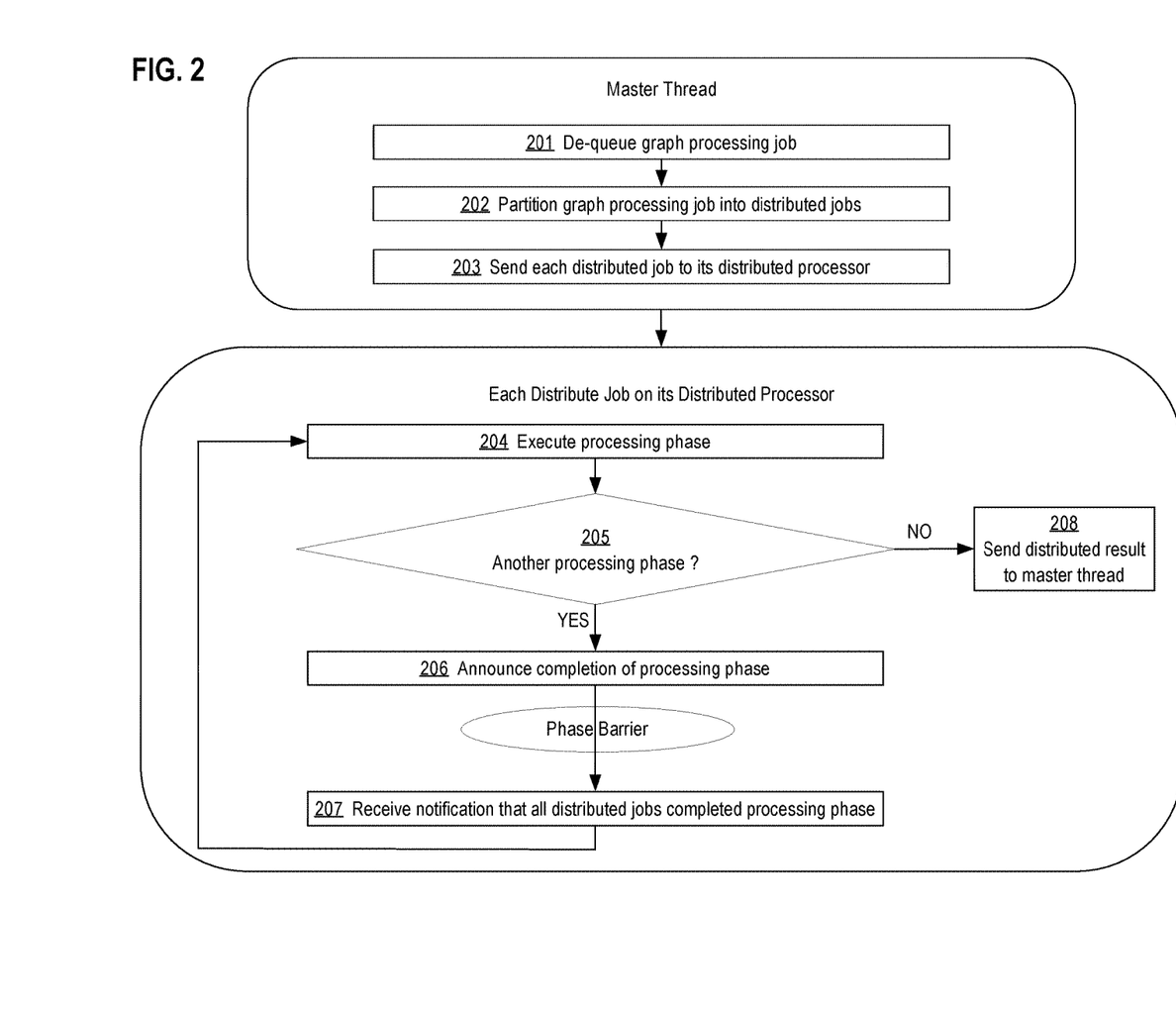
FIG. 2 is a flow diagram that depicts an example process that synchronizes the processing phases of distributed graph-processing jobs, in an embodiment.

FIG. 2 is a flow diagram that depicts an example process that synchronizes the processing phases of distributed graph-processing jobs. FIG. 2 is discussed with reference to FIG. 1.

3.1 Preparation

Steps 201-203 are preparatory and may be performed by master thread 130. Steps 201-202 occur during time T1. Step 201 de-queues a graph processing job.

For example, master thread 130 may take graph processing job 120 from input queue 110. If there is no graph processing job to take, because input queue 110 is empty, then master thread 130 waits (blocks, polls, or spins) until a graph processing job arrives, such as from a client.

Step 202 partitions the graph processing job into distributed jobs. For example, graph processing job 120 may have a Green-Marl script that contains a parallelizable for-each loop that iterates over all twenty vertices of a graph.

Master thread 130 may generate and configure distributed jobs 141-142 that each process ten vertices of the graph. For example, each of distributed jobs 141-142 may identify a (likely disjoint) set of vertices to process. Thus, step 202 may involve graph partitioning and/or task decomposition.

3.2 Horizontal Scaling

In a preferred embodiment, graph processing job 120 is decomposed into as many distributed jobs as are distributed processors available. For example in symmetric multiprocessing (SMP) embodiments, master thread 130 decomposes graph processing job 120 into four distributed jobs if four computational cores are available in a local central processing unit (CPU). In embodiments, master thread 130 decides how many distributed jobs are needed for graph processing job 120 based on the contents of graph processing job 120 or based on the size of the graph.

Step 203 occurs at time T2. In step 203, each distributed job is sent to a respective distributed processor. In SMP embodiments, master thread 130 may send each distributed job to a computational core of a local CPU.

For example, master thread 130 may send each of distributed jobs 141-142 to a separate core of the CPU. Whereas in networked embodiments, each of distributed jobs 141-142 may be sent to a remote computer.

3.2.1 Parallel Execution

After step 203, each of distributed processors 151-152 has a distributed job that is ready to execute. For example, distributed processors 151-152 may be long-lived and already loaded all or a respective portion of the graph that graph processing job 120 is applied to.

Steps 204-207 form a control loop, with each iteration of the loop executing a processing phase. For example, a first iteration of the loop may execute processing phase 161. Likewise, a second iteration of the loop may execute processing phase 162.

Steps 204-207 involve parallel processing. More or less simultaneously, distributed processors 151-152 perform steps 204-207 for a current phase of their respective distributed job.

In step 204, each distributed processor executes the current processing phase of its distributed job. For example, distributed processor 152 may fully execute processing phase 161 of distributed job 142.

Step 205-206 occur at time T3. Step 205 detects whether there are more processing phase(s) to execute. For example, because of another processing phase, 162, remains to be executed in this example, step 205 is followed by step 206.

3.3 Synchronization

In step 206, the distributed job announces its arrival at the phase barrier. For example, distributed job 142 sends arrival announcement 170 to master thread 130. For example, distributed job 142 sends a network message to master thread 130.

Although steps 204-206 are more or less concurrently performed by all distributed jobs 141-142 of graph processing job 120, progress by some distributed jobs may be skewed because coarse-grained task parallelism may be involved. For example network congestion, uneven CPU demand, or unbalanced graph partitioning may cause distributed job 141 to fall behind distributed job 142. For example, distributed job 142 may perform steps 205-206 before distributed job 141 finishes step 204.

Between steps 206-207, distributed jobs 141-142 should wait for master thread 130 to release the phase barrier. For example, distributed job 141 arrives at the phase barrier, performs step 206, and then waits at the phase barrier (as shown) before performing step 207.

Eventually, all of distributed jobs 141-142 have announced their arrival at the phase barrier during step 205 and await barrier release at step 207. In step 207, each distributed job receives notification that all distributed jobs have completed the current processing phase.

For example, master thread 130 may broadcast a notification of barrier release. This means that distributed jobs 141-142 may resume execution by repeating steps 204-207 for the next processing phase.

3.4 Result Integration

Eventually, distributed job 142 finishes final processing phase 162 and performs step 205 again, which detects whether there are additional processing phases to perform. However, this time there are no additional processing phases for distributed job 142.

In this case, step 205 is followed by step 208. In step 208, the distributed job sends its distributed result to the master thread. For example, distributed job 142 sends a message to master thread 130 that contains subgraphs (if any) that satisfy graph processing job 120 that distributed job 142 found.

Eventually, master thread 130 detects that all distributed jobs 141-142 have performed step 208. At this time, master thread 130 has all of the distributed results for graph processing job 120. Thus, distributed processing is finished for graph processing job 120.

However, there may be final serial processing for graph processing job 120. For example, master thread 130 may merge any distributed results sent to it from distributed jobs 141-142 to synthesize a final result for graph processing job 120.

4.0 Decoupled Tiers

Figure 3:
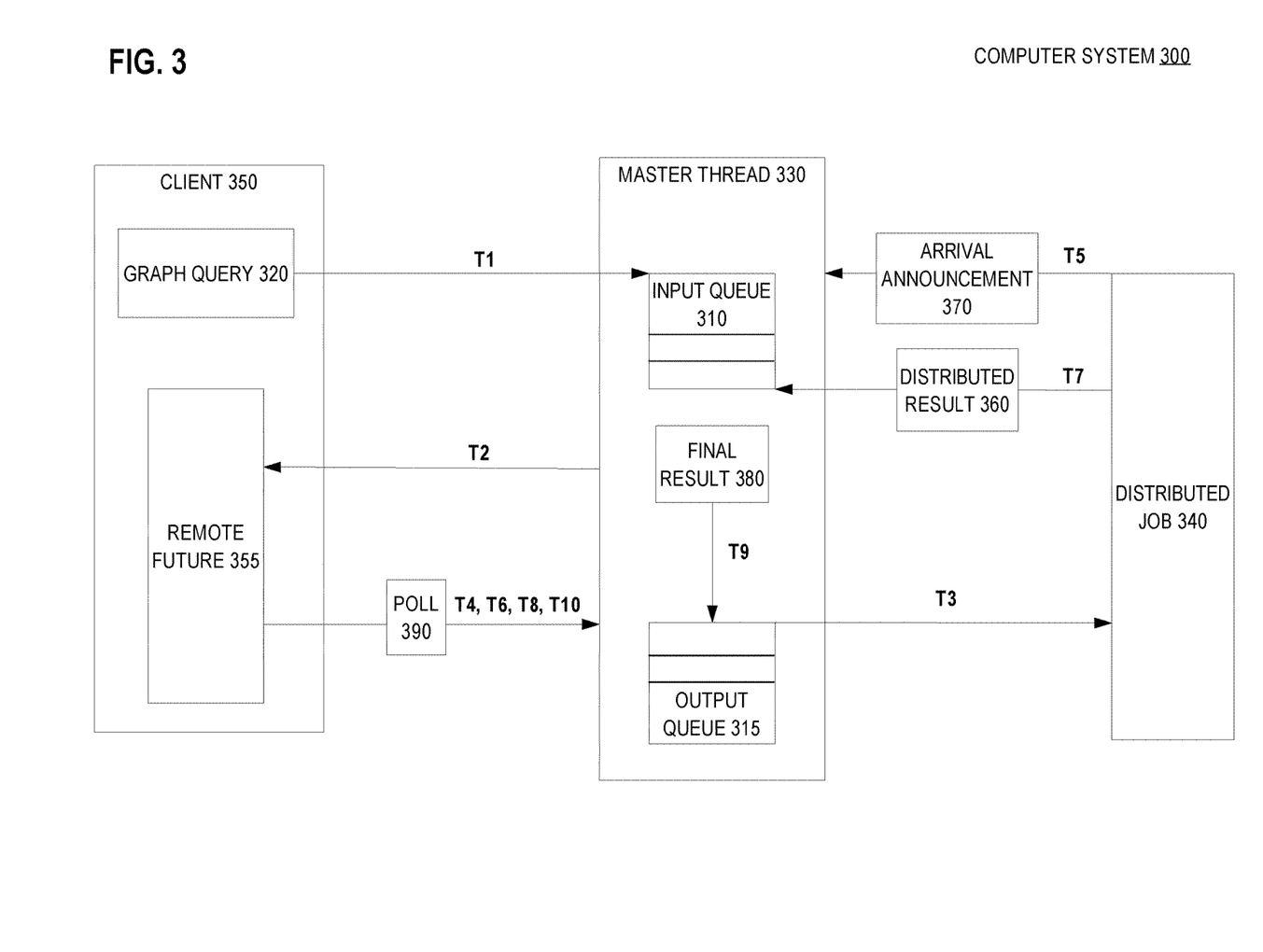
FIG. 3 is a block diagram that depicts an example computer system that uses queueing and polling to decouple processing tiers, in an embodiment.

FIG. 3 is a block diagram that depicts an example computer system 300, in an embodiment. Computer system 300 uses queueing and polling to decouple processing tiers.

Computer system 300 may be an implementation of computer system 100. Computer system 300 includes client 350.

4.1 Remote Client

Client 350 and master thread 330 may be software running on separate computers or separate memory address spaces of a same computer. Thus, client 350 may be a remote client.

At time T1, client 350 sends graph query 320 to a software program that includes master thread 330, such as by a REST command in a common gateway interface (CGI) Post. The software program of master thread 330 may append graph query 320 to input queue 310.

4.2 Remote Future

The software program of master thread 330 more or less immediately responds by sending remote future 355 to client 350 at time T2. Remote future 355 does not contain an actual result of graph query 320. Instead, remote future 355 contains a remote stub (proxy) or contact or callback information that client 350 may use to monitor the availability of an actual result that computer system 300 has yet to produce. Generally, a (computational) future may be used as a placeholder for derived data that might not yet be available, such as when computation of the data is still in progress. By analogy, a future may be somewhat similar to a claim check that can be possessed before eventually being used to retrieve an item. A remote future is a future that is passed from a server to a remote client. Embodiments of a remote future use polling to monitor the availability of data that the server might still be preparing. In this sense, a polling future may be an actor (active component) that is a placeholder for a passive item such as data. For example, a remote client may request data construction by a server, and the server may more or less immediately respond by sending a remote future to the client. Mechanics and implications of polling are discussed below. In embodiments, remote future 355 may comprise an object oriented instance that may: achieve encapsulation such as by information hiding, expose methods, and be amenable to data serialization.

4.3 (De-) Queueing

Master thread 330 sequentially consumes (removes and processes) successive items from input queue 310. Eventually, graph query 320 becomes the head of input queue 310, and master thread 330 de-queues graph query 320.

Master thread 330 decomposes graph query 320 into distributed jobs, such as 340. Master thread 330 may append the distributed jobs, individually or together as a unit, onto output queue 315.

When a distributed job becomes the head of output queue 315, the distributed job is de-queued and sent to a distributed processor for execution. For example, distributed job 340 is dispatched at time T3.

4.4 Polling

At various times such as T4, T6, T8, and/or T10, client 350 may repeatedly use remote future 355 to poll for an answer to graph query 320. For example, remote future 355 may use REST, JSON, SOAP, RPC, XML, and/or HTTP to deliver poll 390 to the software program of master thread 330.

Concurrent to such repeated polling, master thread 330 and distributed jobs, such as 340, continue processing in furtherance of graph query 320. For example, distributed job 340 may begin and finish one of its processing phases and then arrive at the phase barrier of master thread 330.

Distributed job 340 announces its arrival at the phase barrier by sending arrival announcement 370 to the software program of master thread 330 at time T5. In embodiments, arrival announcement 370 may be buffered in input queue 310 before being processed by master thread 330.

Eventually distributed job 340 finishes all of its processing phases and sends its distributed results 360 to the software program of master thread 330 at time T7. Although not shown, other distributed jobs also finish all of their processing phases and send their distributed results. These distributed results are buffered in the input queue 310 for later processing by master thread 330.

No one distributed result of one distributed job represents a complete answer to graph query 320. Instead, master thread 330 must combine the distributed results of all distributed jobs to synthesize final result 380 that is an actual answer to graph query 320.

4.5 Pipelining

In embodiments, master thread 330 de-queues distributed results from input queue one at a time and combines each distributed result into final result 380. For example, master thread 330 may de-queue and integrate some distributed results before input queue 310 has received all distributed results.

Thus, computer system 300 may achieve pipeline parallelism across master thread 330 and distributed job 340. This is in addition to the horizontal (symmetric) parallelism of multiple distributed jobs.

4.6 Results

Eventually, master thread 330 finishes integrating all distributed results into final result 380. At time T9, master thread 330 appends final result 380 to output queue 315 for eventual delivery to client 350.

With remote future 355's next poll 390, client 350 may detect that final result 380 is available. In embodiments, final result 380 is not available until becoming the head of the output queue 315.

For example, output queue 315 may ration limited bandwidth of a network interface card of the computer of master thread 330. For example, client 350 may submit multiple graph queries to analyze a same huge graph.

For example, computer system 300 may interleave processing of multiple graph queries from the same or different clients. Final results for these queries may themselves be large and, if sent back to client(s) simultaneously, could reduce the responsiveness of computer system 300. Such liveliness concerns are discussed later herein.

4.7 Response

In embodiments, poll 390 comprises an HTTP request that is more or less immediately answered by an HTTP response. In embodiments, the HTTP response may bear final result 380 if final result 380 is ready.

In embodiments, the HTTP response indicates that final result 380 is ready. Client 350 may react to the HTTP response by initiating transfer of final result 380 by sending a different HTTP request.

In embodiments, poll 390 is an HTTP Get that attempts to directly retrieve final result 380, such as contained in a transferable file. If final result 380 is unready, then the corresponding HTTP response may contain an HTTP error code such as 404, which indicates that a file was not found.

In embodiments, final result 380 is contained in a file whose filename is undetermined until final result 380 is ready. Thus, an HTTP response that indicates that final result 380 is actually ready may contain a client-side redirect that reveals the actual filename of a file to retrieve with a subsequent HTTP request from client 350.

5.0 Lifecycle

Fulfilling a graph query may involve several long running activities such as distributed jobs and (especially final) result transfer. For example, merely loading a graph (before analyzing it) that has trillions of edges may take days a wall clock time.

Furthermore, client software and the graph query it issues may be experimental or otherwise under ongoing development or refinement. For example, client software or its graph query may be defective (buggy).

5.1 Abrupt Termination

Thus, there may be a need to interrupt, abort, and resubmit a graph query. Traditionally, aborting a cluster of long-running distributed jobs is difficult or destructive.

For example, a graph query may be decomposed and dispatched as a hundred distributed jobs, each of which may need to be separately negotiated to shut down. Furthermore, although terminating (by e.g. a kill command) the operating system process of a distributed job may be reliable, it may cause the loaded image of a graph to be lost, thereby necessitating reloading when the graph query is later adjusted and resubmitted.

Therefore, there may be a need to provide a low-latency and nondestructive interrupt and abort, such as for an edit-debug cycle. Computer system 300 of FIG. 3 has queues needed to maintain liveliness and avoid priority inversion. Computer system 400 of FIG. 4 leverages similar internal mechanisms for particular scenarios.

Figure 4:
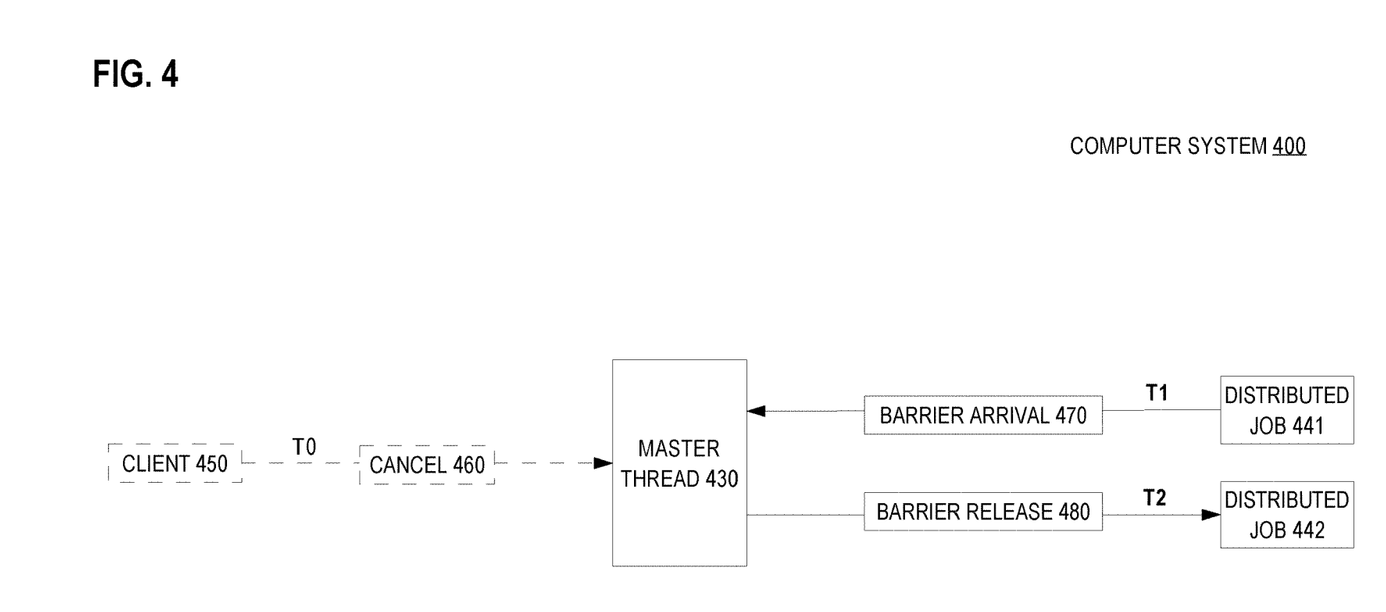
FIG. 4 is a block diagram that depicts an example computer system that uses queues to provide a low-latency and nondestructive way to interrupt, abort, and resubmit distributed jobs, in an embodiment.

FIG. 4 is a block diagram that depicts an example computer system 400, in an embodiment. Computer system 400 uses queues to provide a low-latency and nondestructive way to interrupt, abort, and resubmit distributed jobs. Computer system 400 may be an implementation of computer system 100 or 300.

FIG. 4 shows ongoing distributed processing of a graph query (not shown) by distributed jobs, such as 441-442, that are multiphasic (have multiple processing phases). The phase barrier of master thread 430 presents a synchronization point that enables interruption.

Likewise, the queues (not shown) of master thread 430 present opportunities for interruption. In one scenario, interruption is exogenous due to a cancel command, such as from client 450.

5.2 Fault

In another scenario, interruption is endogenous due to an internal error. For example during a current processing phase, distributed job 441 may fail.

For example, distributed job 441 may throw a software exception. The graph query may have a semantic defect that may cause the software exception, such as when the current processing phase analyzes a particular portion of the graph or executes a particular portion of the logic of distributed job 441.

Thus, distributed job 441 might not successfully complete the current processing phase. However, the phase barrier of master thread 430 may be waiting for all of distributed jobs 441-442 to finish the current processing phase, which cannot occur if distributed job 441 failed.

Distributed job 441 may catch its exception and responsively notify master thread 430 about the exception. For example at time T1, distributed job 441 may send to master thread 430 barrier arrival 470 that contains an indication of failures, such as a flag, error code, or a whole or partial copy of the exception.

Whereas, distributed job 442 may successfully finish the current processing phase and send a barrier arrival, similar to 470, to master thread 430. Master thread 430 may detect that all distributed jobs 441-442 have sent a barrier arrival message and that barrier arrival 470 indicates failure.

5.3 Retained State

Distributed jobs 441-442 may each be hosted by an operating system process that spent much time loading a huge graph. Master thread 430 should not terminate those operating system processes because the memory image of the graph would be lost and would need reloading if the graph query is corrected and resubmitted.

Instead at time T2, master thread 430 may broadcast to all distributed jobs 441-442 barrier release 480 that contains an indication of failures, such as a flag, error code, or a whole or partial copy of the exception. Upon receiving barrier release 480 and detecting its indication of failure, distributed jobs 441-442 may terminate, instead of beginning a next processing phase, and without terminating the operating system process that hosts distributed jobs 441-442.

When distributed jobs 441-442 terminate, the distributed processors that host them are available to begin executing other distributed jobs for another graph query. If a next graph query regards the same graph, then that graph is already loaded in memory because the operating system processes that loaded the graph still exist.

5.4 Cancel

A software fault is one scenario that is mediated by barrier synchronization messages 470 and 480. Another scenario is a cancellation, such as by client 450. Client 450 and cancel 460 are drawn with dashed lines because they are relevant to the cancellation scenario, but irrelevant to the internal failure scenario described above.

In a cancellation scenario, distributed jobs 441-442 may be executing a current processing phase. A developer or other operator may decide to cancel, adjust, and resubmit a graph query.

For example, a developer may monitor a log file that accumulates diagnostic information during the current processing phase. The developer may observe that the latest diagnostic information suggests a semantic malfunction due to a software defect in client 450 or the graph query.

At time T0 and before time T1, client 450 may send cancel 460 to master thread 430. Cancel 460 may comprise a message, such as an HTTP request.

Ideally, master thread 430 should receive cancel 460 out of band. That is, cancel 460 should bypass the input queue (not shown) of master thread 430.

In embodiments, master thread 430 has a separate queue that is reserved for cancellations and other urgent control messages. Thus, master thread 430 may process cancel 460 before processing an existing backlog of the input queue.

Master thread 430 may defer processing of cancel 460 until all distributed jobs 441-442 are waiting at the phase barrier of master thread 430. After all distributed jobs 441-442 have sent a barrier arrival message, such as 470 at time T1, then at time T2 master thread 430 may broadcast to distributed jobs 441-442 barrier release 480 that contains an indication of cancellation, such as a flag, error code, or a whole or partial copy of cancel 460.

Upon receiving barrier release 480 and detecting its indication of cancellation, distributed jobs 441-442 may terminate, instead of beginning a next processing phase, and without terminating the operating system process that hosts distributed jobs 441-442. The developer may correct the graph query or the codebase or configuration of client 450 and resubmit the graph query without computer system 400 needing to reload the graph.

6.0 Extensibility

Figure 5:
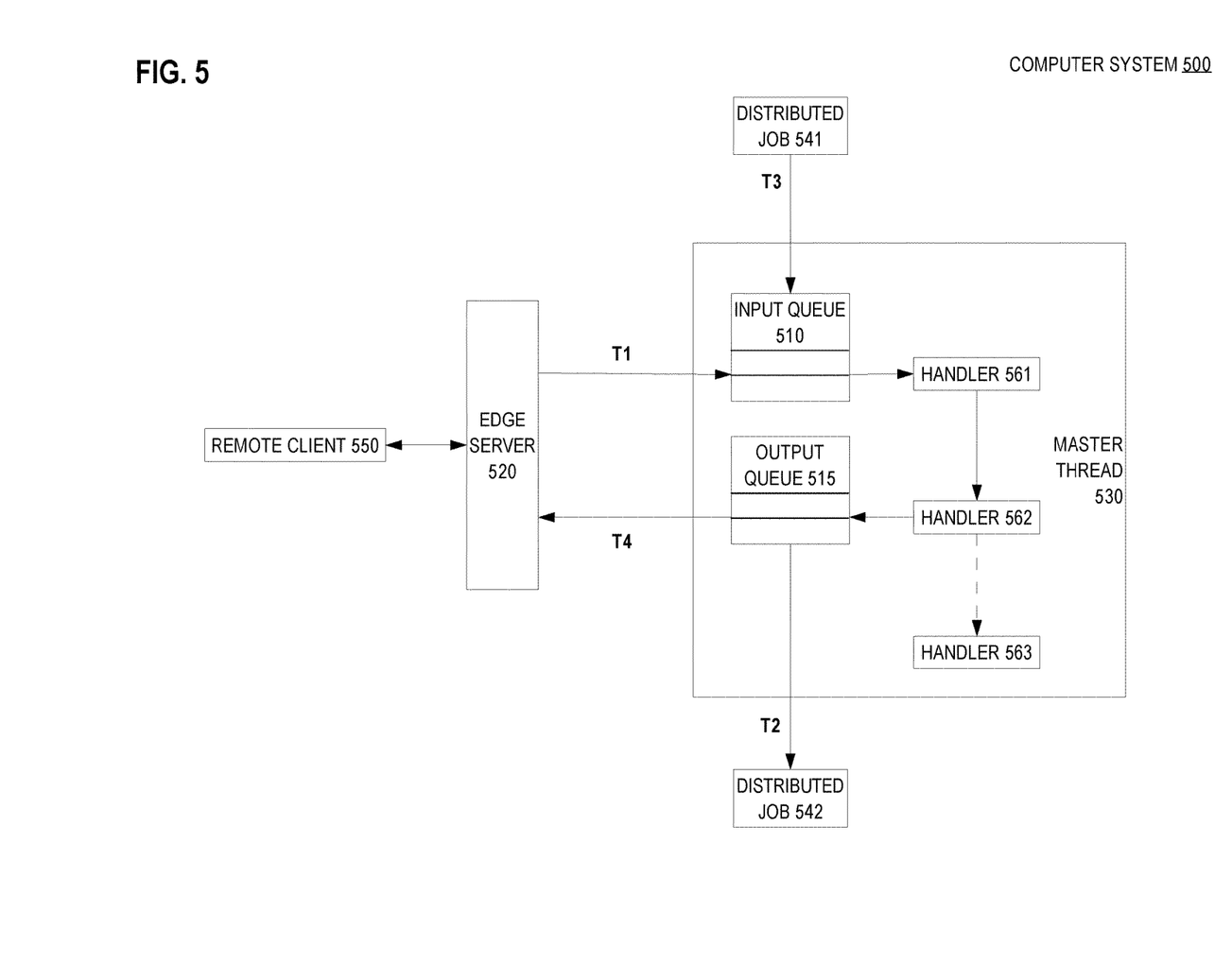
FIG. 5 is a block diagram that depicts an example computer system that uses loose coupling provided by the chain-of-responsibility software design pattern to achieve extensible behavior, in an embodiment.

FIG. 5 is a block diagram that depicts an example computer system 500, in an embodiment. Computer system 500 uses loose coupling provided by the chain-of-responsibility software design pattern to achieve extensible behavior.

Computer system 500 may be an implementation of computer system 100. Computer system 500 includes remote client 550, master thread 530, and edge server 520.

Edge server 520 may comprise a web server, an application server, or other middleware that remote clients, such as 550, may use as a portal or other façade for backend infrastructure that includes master thread 530 and distributed processors that execute distributed jobs such as 541-542.

6.1 Message Type

Master thread 530 may comprise core functionality to receive, queue, and send messages to and from edge server 520 and distributed processors that run distributed jobs. However, the variety of message types that master thread 530 should accommodate may be unknown when master thread 530 is developed and deployed.

For example, clients may submit various commands for master thread 530 to process, such as separate commands to load, analyze, mutate, and save a graph. New types of commands may be introduced after the codebase of master thread 530 is deployed.

Master thread 530 by itself may be unable to handle new types of commands. However, master thread 530 has a modular architecture that enables additional software components to be plugged into the codebase of master thread 530.

6.2 Handler

These additional components may take the form of an interceptor software design pattern, such as handlers 561-563. Each of handlers 561-563 has different logic and/or different configuration that enables the handler to process a distinct type of message.

For example, master thread 530 contains input queue 510. At time T1, remote client 550 may append one type of message, such as a graph query, onto input queue 510.

However also onto the same input queue 510, distributed jobs 541-542 may append distributed results (not shown) that are a different type of message.

Thus, input queue 510 may contain a mix of message types. Each message type may need different processing by master thread 530.

Handlers 561-563 may each handle one of those different message types. For example, handler 561 may process graph query messages. Whereas, handler 562 may process distributed result messages.

6.3 Chain

Furthermore, handlers 561-563 may be daisy chained to form a chain of responsibility. Different embodiments may have different mechanisms for establishing the chain.

The chain of responsibility provides flexibility and simplicity. For example, master thread 530 need not know which handler processes which message type.

In embodiments, handlers 561-563 are polymorphic object-oriented instances that may be ordered as an array or linked list. In embodiments, the array or linked list contains function pointers. In embodiments, dependency injection is used to supply each handler with an object reference or function pointer to the next handler in the list.

Furthermore, master thread 530 need not know which type is any message. Instead, master thread 530 may dequeue a message of undetermined type and invoke the chain of responsibility by passing in the message.

6.4 Operation

The operation of the handler chain ensures that a message is processed by the appropriate handler within the chain. For example, master thread 530 may pass the message to the head of the chain, which is handler 561.

Handler 561 inspects the message and detects whether the type of the message is the type that handler 561 expects to process. For example, handler 561 may expect graph query messages.

If the message is a graph query message, then handler 561 processes it. Otherwise, the handler chain passes the message to the next handler in the chain, which is 562.

Handler 562 may expect distributed result messages. If the message is a distributed result message, then handler 562 processes it.

Otherwise, the handler chain invokes the next handler in the chain, which is 563. The handler chain may be arbitrarily long, and eventually the message visits whichever is the proper handler for the message.

In embodiments, a handler returns a code that indicates to the handler chain whether the handler accepted and processed the message or whether the message should continue down the chain in search of a proper handler. In embodiments without handler return codes, a handler conditionally invokes the next handler in the chain if the handler cannot accept (handle) the message.

6.5 Deployment

Furthermore, additional handlers can be inserted into the chain after deployment of the codebase of master thread 530. For example, a new kind of remote client 550 may send a new message type that needs a new handler.

Handlers may be developed for specific clients (applications) or for general reuse. For example, unrelated handlers may be developed without knowledge of each other and then deployed together to process the same graphs. For example, queues 510 and 515 may contain messages related to different client applications and/or different graphs.

A declaration of the new handler can be added to a configuration file that master thread 530 may rescan, such as during startup or upon de-queuing each message. In this way, the vocabulary of message types that are acceptable to master thread 530 is extensible.

6.6 Invocation

Times T1-T4 occur for different messages. I.e., time T4 does not necessarily indicate a response to a request at time T1.

Instead and assuming that handler 561 handles the request of T1, then it is handler 561 that may also send a response. For example at time T1, a graph query may arrive that handler 561 handles.

Handler 561 may generate a remote future (as explained elsewhere above) to track the progress of the graph query and send the remote future back to remote client 550 through output queue 515 and edge server 520. Thus generally, a handler may dequeue a message from input queue 510, process it, and then append a response onto output queue 515, without processing by other handlers.

6.7 Collaboration

In embodiments, multiple handlers may process a same message. For example, handler 561 may process a graph query and then invoke handler 562 with the same query. In embodiments, a handler may alter a message while handling it.

6.8 Translation

For example, handler 561 may receive a SPARQL query, convert it to a proprietary format, and pass the proprietary query to handler 562. Although not shown, the handler chain may also have a handler that converts a Cypher query into a proprietary query. Thus, computer system 500 may accept multiple query or job languages.

Handler 562 partitions the query and/or graph to generate distributed jobs 541-542 and append distributed jobs 541-542 onto output queue 515 for transfer to CPU cores (not shown). At time T2, distributed job 542 is dispatched to its CPU core for execution.

At time T3, distributed job 541 has finished all of its processing phases and appends its distributed result onto input queue 510 for the handler chain to process. For example, handler 563 may be invoked for distributed job's distributed result message to accumulate a final result for the query.

6.9 Edge Server

In alternative embodiments, handler 563 creates a message that contains the final result and append the message onto output queue 515 for sending to remote client 550 at time T4. In preferred embodiments, handler 563 instead stores in a file or buffer (not shown) the final result that remote client 550 should poll for and retrieve.

In embodiments, edge server 520 receives and fulfills poll or retrieval requests without involving master thread 530. In embodiments, master thread 530 writes the final result to a file that edge server 520 cross mounts.

7.0 Related Jobs

Figure 6:
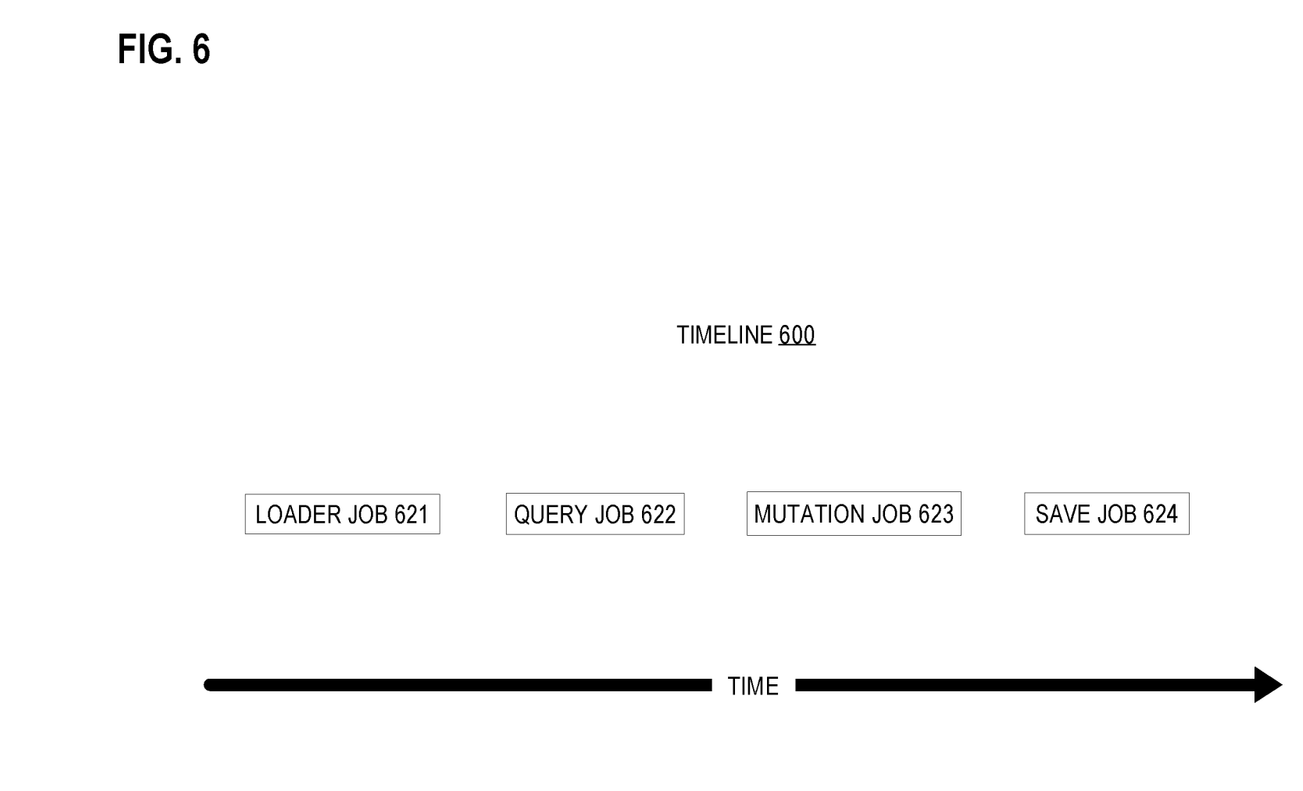
FIG. 6 is a block diagram that depicts an example timeline for a progression of related jobs that a client submits for extended processing of a same graph, in an embodiment.

FIG. 6 is a block diagram that depicts an example timeline 600, in an embodiment. Timeline 600 shows a progression of related jobs that a client submits for extended processing of a same graph.

The client submits jobs 621-624 individually and in sequence, beginning with 621. The client may wait for one job to finish executing before submitting the next job.

For example, the master thread may decompose loader job 621 into a distributed job for each computer of a cluster. Each distributed job may load some or all of a huge graph from a graph database or file and into the memory of its computer.

The client may wait for loader job 621 to finish before submitting query job 622 to discover interesting details of the graph that already resides in memory. Although not shown, query job 622 may have multiple processing phases to achieve complicated analysis. Based on the details discovered, the client may submit mutation job 623 to make a desired change to the graph.

Having adjusted the graph, the client may submit save job 624 to write the changes (or the whole graph) back into the graph database. Because each computer of the cluster hosts a software service that remains available after executing a distributed job, sequential client jobs may share state, such as a loaded graph.

In this way, complicated processing can be composed of multiple simpler job types, some of which may be reusable. For example, loader job 621 may be based on a generic loader job that any client may submit with custom parameter values to load any graph.

8.0 Serial Logic

Figure 7:
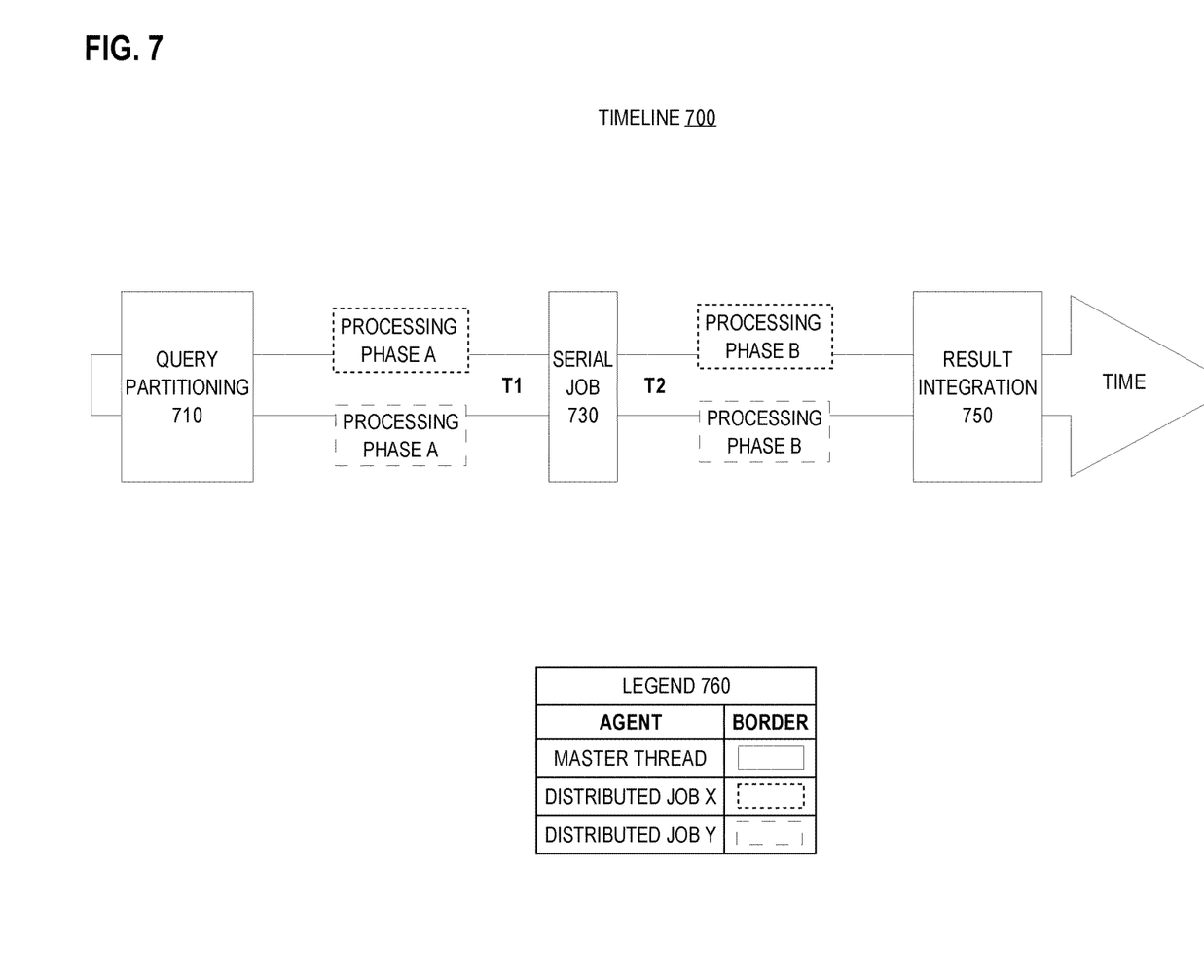
FIG. 7 is a block diagram that depicts an example timeline for serial processing between processing phases of distributed jobs, in an embodiment.

FIG. 7 is a block diagram that depicts an example timeline 700, in an embodiment. Timeline 700 shows serial processing between processing phases of distributed jobs.

The boxes overlaid on timeline 700 each shows an activity performed at a particular time in a computer cluster. According to legend 760, which border a box is drawn with indicates which agent executes the activity of the box.

Available agents include the master thread and distributed jobs X-Y, each of which may be hosted on a separate computer or CPU core. When a graph query arrives, the master thread partitions it into distributed jobs X-Y and serial job 730 during query partitioning 710.

Distributed jobs X-Y are multiphasic, including processing phases A-B. At time T1, the master thread detects (as explained elsewhere above) that all distributed jobs X-Y have finished processing phase A and are waiting at the phase barrier.

Ordinarily the master thread may immediately broadcast a barrier release to distributed jobs X-Y so that X-Y may begin processing phase B. Instead, the master thread itself executes serial job 730, starting at time T1 and finishing at time T2.

For example, the graph query may comprise a SPARQL script with serial logic between two parallel for-each loops. The first for-each loop may be implemented as processing phase A as shown.

Likewise, the second for-each loop may be processing phase B. Likewise, the serial logic of the SPARQL script could be executed as serial job 730.

At time T2, serial job 730 finishes, and the master thread broadcasts a barrier release message to distributed jobs X-Y. This causes processing phase B to begin.

After processing phase B, distributed jobs X-Y send their distributed results to the master thread. In this example, the master thread may wait until all distributed results arrive before performing result integration 750 to synthesize a final result that fully answers the SPARQL query.

Timeline 700 may additional processing phases and serial jobs, although not shown. In this way, script execution may alternate between parallel and serial processing, such as supposed by Amdahl's Law.

In embodiments, serial job execution may be partially or entirely simultaneous to distributed job execution. For example, the master thread may broadcast the barrier release to distributed jobs X-Y before executing serial job 730. Thus, serial job 730 and processing phase B may simultaneously execute.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
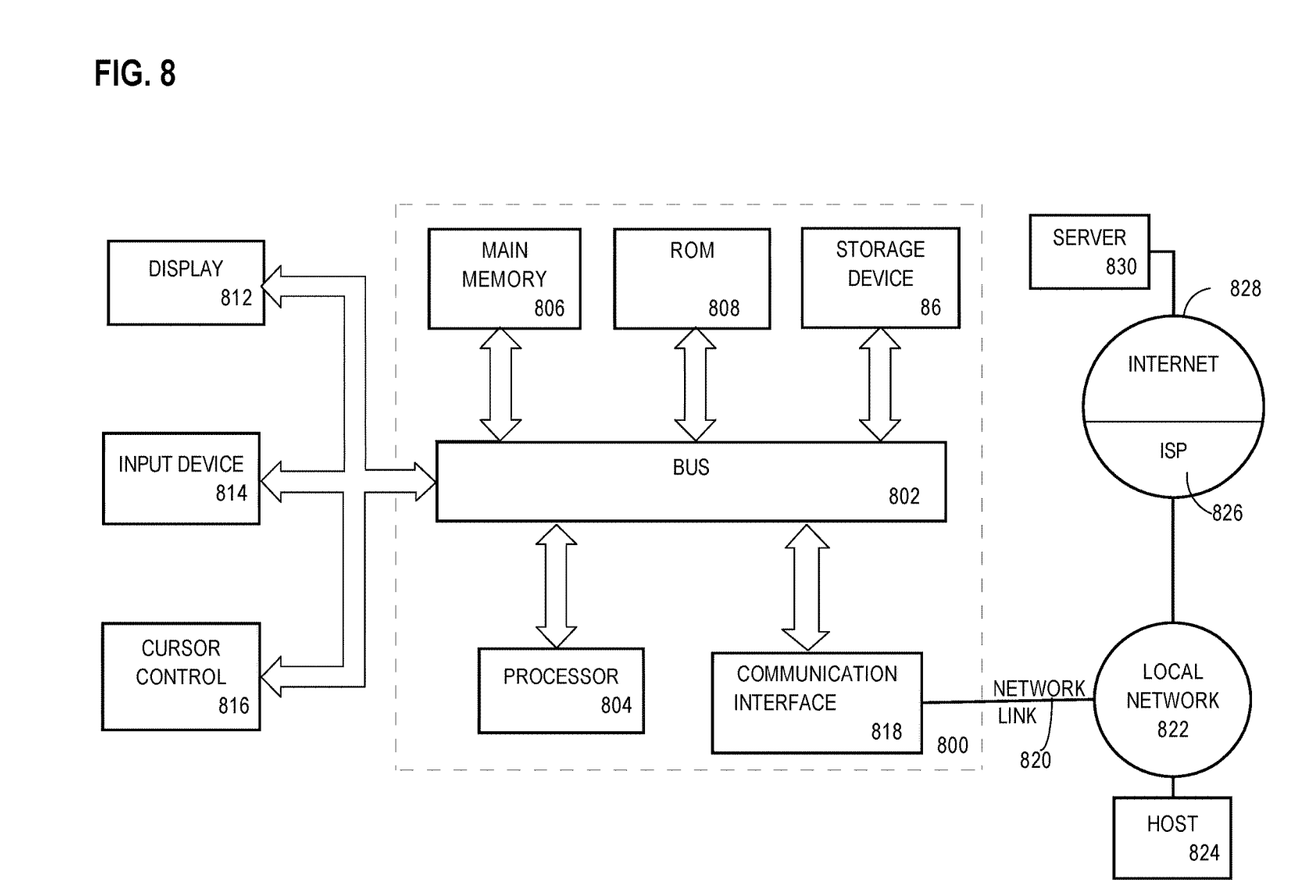
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or another communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or another dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 86, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 86. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 86. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 86 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 86, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a master thread:
  receiving and de-queuing a graph processing job;
  partitioning the graph processing job from a client into a plurality of distributed jobs, wherein each distributed job of the plurality of distributed jobs comprises a sequence of processing phases;
  sending each distributed job of the plurality of distributed jobs to a distributed processor; each distributed job of the plurality of distributed jobs:
  announcing completion of a first processing phase of the sequence of processing phases of the distributed job receiving a notification that the plurality of distributed jobs completed the first processing phase, and
  executing a second processing phase of the sequence of processing phases of the distributed job;
  generating a final result of the graph processing job based on a distributed result from each distributed job of the plurality of distributed jobs;
  appending said final result onto a tail of a queue;
  providing, after said final result becomes a head of said queue, said final result to said client.

2. The method of claim 1 wherein:
said client is a remote client; or
availability of said final result is announced to said client before said providing said final result to said client.

3. A method comprising:
a master thread:
  in response to receiving a graph processing job:
    queuing the graph processing job, and
    sending a remote future that tracks availability of a final result of the graph processing job;
  partitioning the graph processing job into a plurality of distributed jobs, wherein each distributed job of the plurality of distributed jobs comprises a sequence of processing phases, and
  sending each distributed job of the plurality of distributed jobs to a distributed processor; each distributed job of the plurality of distributed jobs:
  announcing completion of a first processing phase of the sequence of processing phases of the distributed job,
  receiving a notification that the plurality of distributed jobs completed the first processing phase, and
  executing a second processing phase of the sequence of processing phases of the distributed job;
  announcing, in response to receiving a poll from said remote future, said availability of said final result; and
  providing said final result to a client.

4. The method of claim 1 wherein:
partitioning the graph processing job into a plurality of distributed jobs comprises further partitioning the graph processing job into at least one serial job for the master thread to execute;
receiving the notification that the plurality of distributed jobs completed the first processing phase comprises receiving the notification in response to the master thread finishing execution of a serial job of the at least one serial job.

5. The method of claim 1 wherein:
a first distributed processor announcing completion of the first processing phase comprises announcing an error;
a second distributed processor executing the second processing phase comprises not executing the second processing phase because of the error.

6. The method of claim 2 wherein:
receiving the notification that the plurality of distributed jobs completed the first processing phase comprises receiving a cancellation from said remote client;
executing the second processing phase comprises not executing the second processing phase because of the cancellation.

7. The method of claim 1 wherein:
the graph processing job comprises a loading job that loads a graph into memory;
the method further comprises executing, after the graph processing job finishes, a second graph processing job to analyze the graph as loaded by the loading job.

8. The method of claim 1 wherein partitioning the graph processing job comprises successively invoking a sequence of handlers until a handler accepts responsibility for the graph processing job.

9. The method of claim 1 wherein queuing occurs for said announcing completion of the first processing phase.

10. The method of claim 1 wherein:
a network request comprises at least one of: representational state transfer (REST), simple object access protocol (SOAP), remote procedure call (RPC), or extensible markup language (XML);
the network request comprises at least one of: the graph processing job, a final result of the graph processing job, or a poll to check availability of the final result.

11. The method of claim 1 wherein sending each distributed job of the plurality of distributed jobs to a distributed processor comprises sending each distributed job of the plurality of distributed jobs to one of: a processor core, a remote computer, a virtual machine, or a respective address space.

12. One or more non-transitory computer-readable media storing instructions that, when executed by one or more processors cause:
a master thread:
receiving and de-queuing a graph processing job;
partitioning the graph processing job from a client into a plurality of distributed jobs, wherein each distributed job of the plurality of distributed jobs comprises a sequence of processing phases;
sending each distributed job of the plurality of distributed jobs to a distributed processor; each distributed job of the plurality of distributed jobs:
announcing completion of a first processing phase of the sequence of processing phases of the distributed job, receiving a notification that the plurality of distributed jobs completed the first processing phase, and
executing a second processing phase of the sequence of processing phases of the distributed job;
generating a final result of the graph processing job based on a distributed result from each distributed job of the plurality of distributed jobs: appending said final result onto a tail of a queue;
providing, after said final result becomes a head of said queue, said final result to said client.

13. The one or more non-transitory computer-readable media of claim 12 wherein:
said client is a remote client; or
availability of said final result is announced to said client before said providing said final result to said client.

14. One or more non-transitory computer-readable media storing instructions that, when executed by one or more processors cause:
a master thread:
in response to receiving a graph processing job:
queuing the graph processing job, and
sending a remote future that tracks availability of a final result of the graph processing job;
partitioning the graph processing job into a plurality of distributed jobs, wherein each distributed job of the plurality of distributed jobs comprises a sequence of processing phases, and
sending each distributed job of the plurality of distributed jobs to a distributed processor; each distributed job of the plurality of distributed jobs:
announcing completion of a first processing phase of the sequence of processing phases of the distributed job,
receiving a notification that the plurality of distributed jobs completed the first processing phase, and
executing a second processing phase of the sequence of processing phases of the distributed job;
announcing, in response to receiving a poll from said remote future, said availability of said final result; and
providing said final result to a client.

15. The one or more non-transitory computer-readable media of claim 12 wherein:
partitioning the graph processing job into a plurality of distributed jobs comprises further partitioning the graph processing job into at least one serial job for the master thread to execute;
receiving the notification that the plurality of distributed jobs completed the first processing phase comprises receiving the notification in response to the master thread finishing execution of a serial job of the at least one serial job.

16. The one or more non-transitory computer-readable media of claim 12 wherein:
a first distributed processor announcing completion of the first processing phase comprises announcing an error;
a second distributed processor executing the second processing phase comprises not executing the second processing phase because of the error.

17. The one or more non-transitory computer-readable media of claim 13 wherein:
receiving the notification that the plurality of distributed jobs completed the first processing phase comprises receiving a cancellation from said remote client;
executing the second processing phase comprises not executing the second processing phase because of the cancellation.

18. The one or more non-transitory computer-readable media of claim 12 wherein:
the graph processing job comprises a loading job that loads a graph into memory;
the instructions, when executed by the one or more processors, further cause executing, after the graph processing job finishes, a second graph processing job to analyze the graph as loaded by the loading job.

19. The one or more non-transitory computer-readable media of claim 12 wherein partitioning the graph processing job comprises successively invoking a sequence of handlers until a handler accepts responsibility for the graph processing job.

20. The one or more non-transitory computer-readable media of claim 12 wherein queuing occurs for said announcing completion of the first processing phase.

* * * * *

UNITED STATES PATENT AND TRADEMARK OFFICE
CERTIFICATE OF CORRECTION

PATENT NO. : 10,318,355 B2  
APPLICATION NO. : 15/413811  
DATED : June 11, 2019  
INVENTOR(S) : Lee et al.

Page 1 of 1

It is certified that error appears in the above-identified patent and that said Letters Patent is hereby corrected as shown below:

In the Claims

In Column 17, Line 59, in Claim 1, delete "job" and insert -- job, --, therefor.

In Column 19, Line 18, in Claim 12, delete "processors" and insert -- processors, --, therefor.

In Column 19, Line 37, in Claim 12, delete "jobs:" and insert -- jobs; --, therefor.

In Column 19, Line 48, in Claim 14, delete "processors" and insert -- processors, --, therefor.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*